Nov. 19, 1929.  G. R. BAKER  1,736,517
CONVEYING APPARATUS
Filed June 20, 1927  2 Sheets-Sheet 1
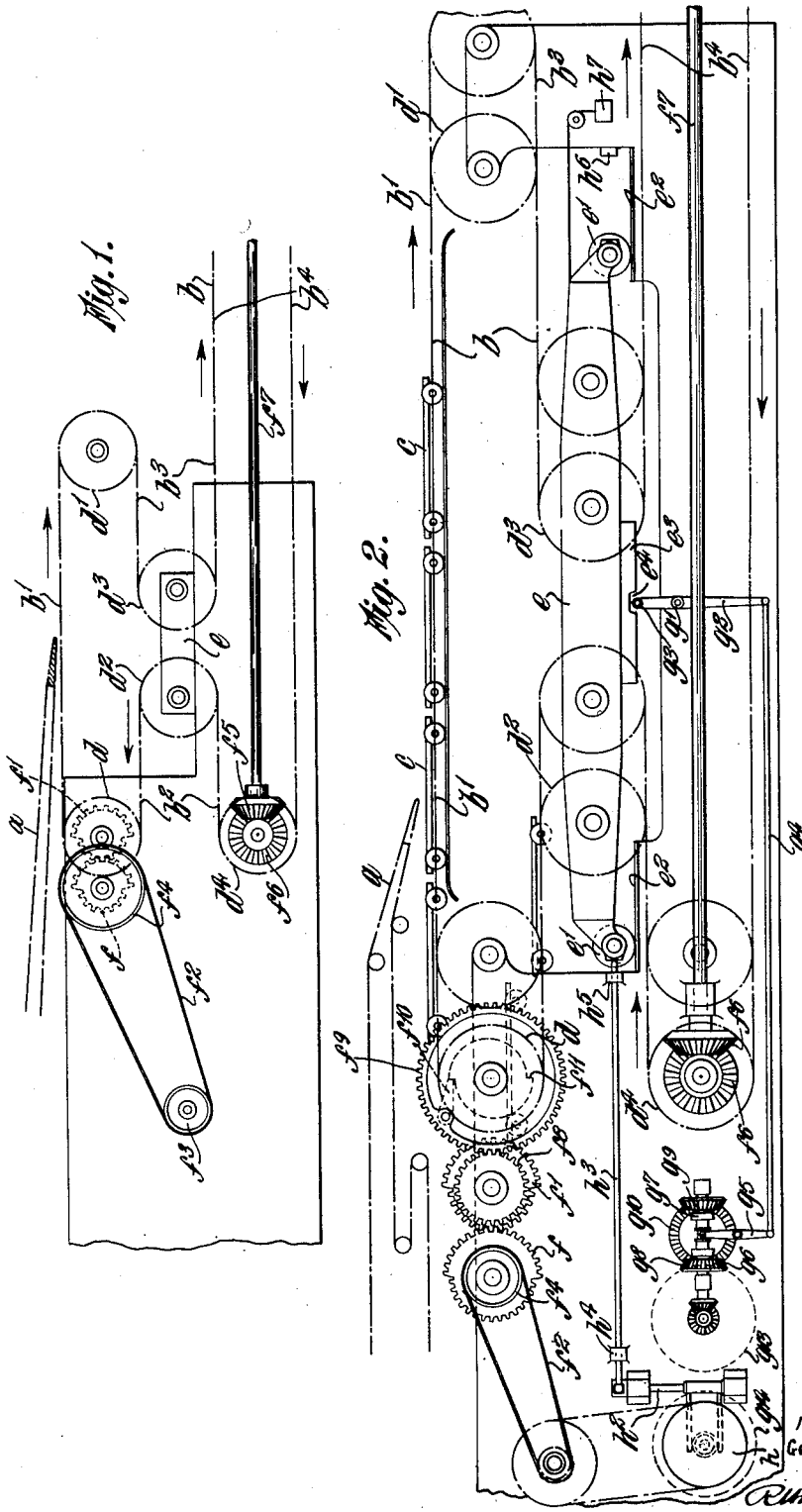

Nov. 19, 1929.   G. R. BAKER   1,736,517
CONVEYING APPARATUS
Filed June 20, 1927    2 Sheets-Sheet 2
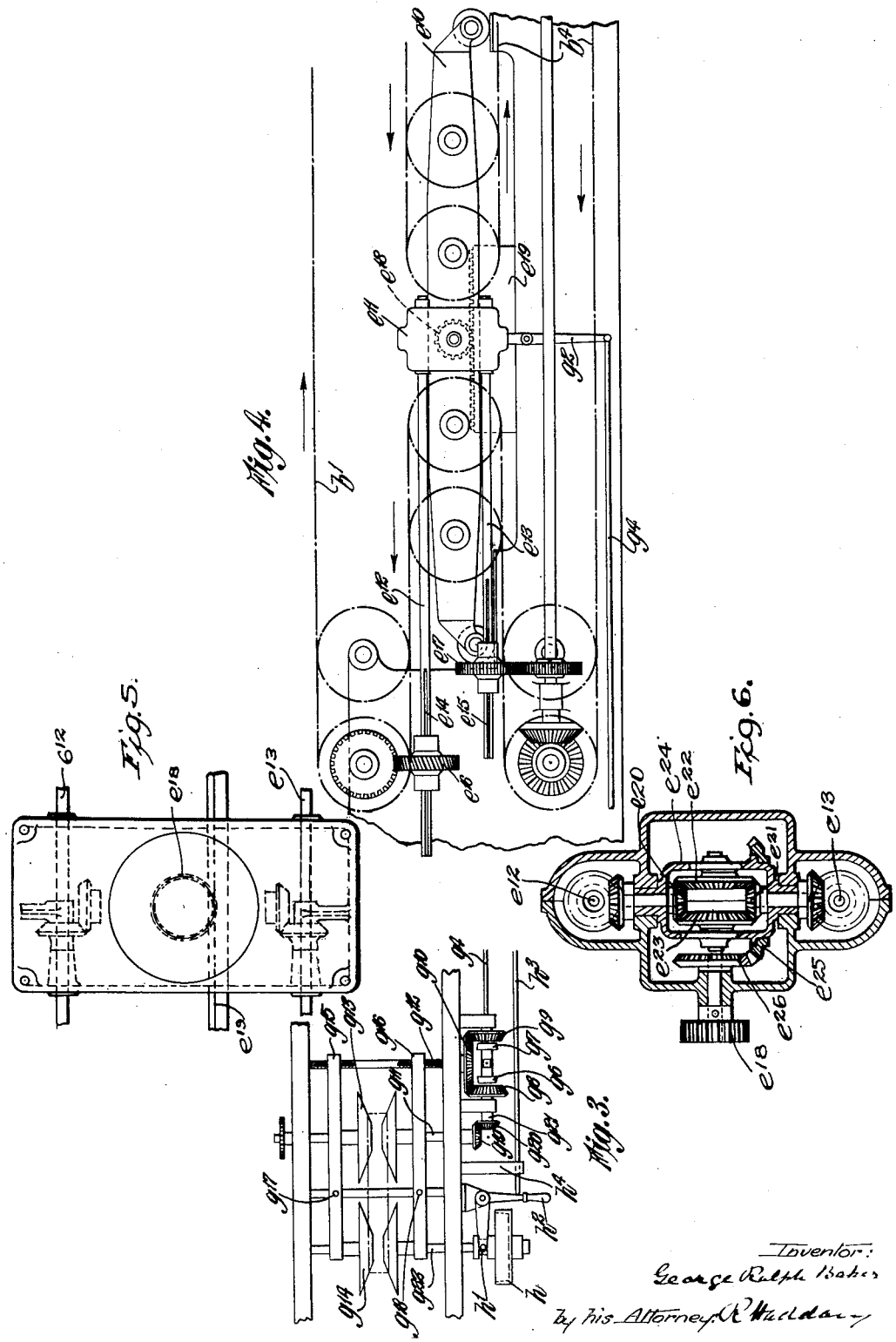

Patented Nov. 19, 1929

1,736,517

UNITED STATES PATENT OFFICE

GEORGE RALPH BAKER, OF LONDON, ENGLAND, ASSIGNOR TO BAKER PERKINS COMPANY, INCORPORATED, OF NEW YORK, N. Y., A CORPORATION OF NEW YORK

CONVEYING APPARATUS

Application filed June 20, 1927, Serial No. 200,261, and in Great Britain July 30, 1926.

This invention relates to conveying apparatus, more particularly for use in the manufacture and baking of bread, biscuits and the like but not limited to such use, and the object is to provide a continuous or substantially continuous conveyor member or members such as a web, band, chains or the like in which different portions thereof may be independently driven at relatively differential speeds for the purpose of accommodating the apparatus to variations of speed or operation between devices with which said conveying apparatus may be associated or for other purposes or reasons connected with the operation of the conveyor. Such conveyor may therefore be operated so as to give a determined, constant, or uniform rate of discharge of articles carried by the conveyor by providing for retaining on the conveyor what may be termed an automatic balance or reserve of said articles which can be drawn upon as required to maintain said determined, constant or uniform rate of discharge in spite of variations in the normal feed of the articles to the conveyor or temporary stoppage of said feed.

To such a conveyor, or in fact to any conveyor of a continuous character, the present invention is applied by forming or dividing same into a plurality of sections capable of operating temporarily at different speeds by disposing that portion of the conveyor which lies between the portions to which differential speeds are or are to be given in oppositely positioned or directed bights or loops the effective length of one of which may be increased while that of the other is reduced without affecting the length of the conveyor as a whole. Thus, assuming the bight in the advance run of the conveyor to be extended or increased to its full extent a maximum reserve of articles is provided in said bight between the feed and delivery portions of the conveyor and this reserve may be drawn upon according to requirements owing, for example, to the stoppage or irregular feed of the articles to the conveyor, by reducing the length of said bight so that the uniform or other required rate of delivery of the articles may be maintained.

For ensuring the automatic balance of reserve or proper movements of the compensatory bights of the conveyor it is desirable to provide that the drive of the receiving portion of the conveyor is in unison with that of a feed device for the articles with which the conveying apparatus may be associated, and that the drive of the discharge portion of the conveyor is in unison with that of the device to which the articles are to be delivered, and a compensatory control between the two sections of the conveyor may be provided for by a mechanism brought into action by a displacement of the compensatory portion of the conveyor so as to cause acceleration or retardation of one of the drives with respect to the other as the case may require. It will however be understood that if both sections of the conveyor are operating at the same speed, this control will not come into action and the respective runs of the compensatory bights of the conveyor will remain undisturbed as to length.

In the application of the invention to the manufacture and baking of biscuits such a conveying apparatus would be located between the usual delivery web of a biscuit cutting or moulding machine, (which web may be of the advancing and receding type or of the continuous delivery or other desired kind) and the oven, and the conveyor members proper, for example continuous chains carrying pans into which the biscuits from the cutting or moulding machine are delivered, may with advantage be continued to extend through the oven in one or more courses, in the latter case suitably in a circuitous path, and finally return to the commencement or receiving position.

For example, two chain conveyor sections may be provided, one associated with the biscuit cutting or moulding machine and one passing through the oven chamber. The section of conveyor associated with the cutting or moulding machine is driven in synchronism with that machine whether such drive be uniform or intermittently variable and it stops and starts therewith whilst the other section, which has its speed controlled according to the speed required in passing the goods through the oven, is temporarily independent of the speed of the cutting machine.

Differences of speed of the two conveyor sections are compensated by extending or contracting the conveyor on its advance and return runs into the oppositely extended or directed loops or bights previously mentioned whereby if the cutting machine is temporarily filling pans faster than the oven conveyor section is carrying them away, the length of the bight of filled pans between the cutting machine and oven will increase and the bight in the return run will correspondingly decrease. On the other hand if the cutting machine runs slower than the oven conveyor section or is stopped, the reserve of filled pans in the advance bight is drawn upon and the bight decreases whilst the return bight increases in length.

Suitable mechanism for controlling the length of the bights so that the conveyor as a whole is positively driven while the section associated with the cutting machine is driven in unison with that machine and that of the oven is driven by its own independent mechanism, may be provided as follows:—Two shafts carrying sprockets or equivalents about which the conveyor passes at the ends of the compensating bights are mounted in one or more carriages or slides which are free to move so as to lengthen or shorten the bights relatively to one another.

Movement of such carriage will occur automatically when either the receiving section or the oven section of the conveyor moves faster or slower than the other.

Movement of such carriage in either direction from a middle position may set in action speed control gear which will act to accelerate or retard the speed of one of the drives in relation to the other. This may occur after a period of lost motion of the carriage if desired.

In another form of the invention means are provided whereby the compensating carriage is positively moved by differential gearing driven from the drives of the two portions of the conveyor, so that the compensating bights are lengthened and shortened respectively exactly as required to compensate the difference in speed of the two portions of the conveyor. Such a differential gear may be mounted on the carriage itself and may be similar to that used in motor vehicle construction, and it may include two driving shafts one of which is positively driven in synchronism with the cutting machine, and the other being similarly driven from the oven conveyor section drive. The differential gear is so constructed or arranged that the carriage remains stationary if the cutting machine drive and oven conveyor drive are moving at the same speed but if the speed of one becomes faster than that of the other the said gear causes the carriage to move in one direction or the other to exactly compensate such difference in speeds.

Automatic means may be provided to stop the cutting machine when the advance bight is extended to its full capacity. Further, automatic or manually operated means may be provided whereby the drive from the cutting machine may be uncoupled when the advance bight is empty and the whole conveyor is driven by the oven section driving mechanism so that the goods in the oven can be emptied out without running the cutting machine for the whole time.

The receiving section drive should operate through a clutch capable of permitting the said section to overrun its drive when the cutting machine is stopped or when the compensating bight in the feeding portion of the conveyor reaches its minimum position.

This invention is illustrated in the accompanying drawing in diagrammatic form as applied to a biscuit oven with feed device.

Fig. 1 is a diagrammatic side elevation showing a portion of a conveyor comprising the compensating bights and separate driving mechanism for the two parts of the conveyor separated by said compensating bights.

Fig. 2 is a similar diagram but showing also further details of the driving mechanisms with differential and stop motions and an overrunning motion.

Fig. 3 is a diagram in plan of part of such differential and stop motions.

Fig. 4 is a diagram in side elevation of a modified form of differential drive.

Figs. 5 and 6 are, respectively, a side elevation and a sectional view of the differential gear represented in Fig. 4.

$a$ represents a feed belt of known type for depositing the cut out or moulded portions of unbaked dough upon the conveyor $b$, or more usually upon pans such as $c$ (Fig. 2) carried by the conveyor $b$. The conveyor $b$ is carried by sprocket wheels or drums as the case may be (hereinafter referred to as sprocket wheels). The receiving portion $b^1$ of the conveyor $b$ extends from sprocket wheel $d$ to sprocket wheel $d^1$. The conveyor passes about these wheels $d$ $d^1$ and is carried in the form of two oppositely directed bights $b^2$ $b^3$ around two sprocket wheels $d^2$ $d^3$ the shafts of which are mounted in a carriage $e$ capable of endwise movement in either direction with respect to the bights $b^2$ $b^3$. The conveyor extends from the bight $b^2$ round a sprocket wheel $d^4$ and thence to the oven, in which it may pass along a circuitous course if desired, finally returning to bight $b^3$, the oven section being designated by $b^4$.

The sprocket wheel $d$ is driven in conjunction with the drive of the dough cutting machine (not shown) and this drive is preferably intermittently variable as shown by the intermeshing spur wheels $f$ $f^1$ each having portions of different radii. The spur wheel $f^1$ is mounted on the shaft of sprocket wheel $d$, and the spur wheel $f$ engages with wheel $f^1$ and is driven as by a chain $f^2$ from sprocket $f^3$ to sprocket $f^4$ on the shaft of wheel $f$. The sprocket wheel $d^4$ is driven by bevelled gear $f^5$ $f^6$ from a shaft $f^7$, which latter is itself driven in any desired manner not shown, such drive being independent from that of sprocket $f^3$. It will be obvious that the carriage $e$ will move (within the limits of its travel) when any difference occurs between the speeds of the drives to the two sections of the conveyor, i. e. $f$ $f^1$ and $f^5$ $f^6$. It will be understood that the length of section $b^1$ and of the bights $b^2$ $b^3$ may be such as the nature of the apparatus may require according to the duty it is to perform.

In applying the invention to a conveyor which carries trays which are intended to remain horizontal at all times, reference may be made to Fig. 2 in which also speed control and stop motions are illustrated as well as an overrunning motion for permitting the oven section drive to overrun the receiving section drive. The sprocket wheels $d$—$d^4$ are here duplicated in order to maintain horizontality of the trays where they move from one horizontal flight or run to another. This feature is well known per se, and can be effected in various ways, and it forms no part of the present invention. It will be apparent, however, that by keeping the pans constantly horizontal, they will pass around the sprocket $d^1$ and $d^3$ to the upper run of the oven section $b^4$ without danger of being inverted and spilling their contents. The drive is transmitted to the receiving section $b^1$ of the conveyor by a pair of gear wheels $f^8$ $f^9$, the gear wheel $f^8$ being on the same shaft as the two-radii wheel $f^1$, and the gear wheel $f^9$ driving the sprocket wheel $d$ of the conveyor through a dog or dogs $f^{10}$ engaging ratchet $f^{11}$, this construction forming an overrunning clutch whereby the speed of the conveyor may exceed that given to it by the gear $f$ $f^1$, thus permitting the drive of the cutting mechanism and feed mechanism (not shown) to be slowed down or stopped without slowing or stopping the conveyor as a whole.

To prevent the drive of the oven section $b^4$ from causing an acceleration of the receiving section $b^1$ beyond the pace at which the drive of section $b^1$ is normally intended to operate during the slow speed portion of the travel of section $b^1$, means are preferably provided, as for example a weight $h^7$ normally tending to draw the carriage $e$ towards a stop $h^6$, thus tending to hold back the section $b^1$ and keep the dog or dogs $f^{10}$ in engagement, until or unless the carriage $e$ is definitely arrested by contact with the stop $h^6$.

The carriage $e$ is provided with rollers $e^1$ $e^1$ and runs on track $e^2$ $e^2$. The carriage $e$ carries a plate $e^3$ having a recess $e^4$. On the machine frame is pivoted at $g^1$ a lever $g^2$ carrying on one arm a roller $g^3$ normally projecting into said recess $e^4$. When the carriage $e$ moves in either direction the edge of the recess will, after a space of lost motion, contact with the roller $g^3$ and rock the lever $g^2$ in one or the other direction according to the direction of movement of the carriage $e$. The other arm of the lever $g^2$ is connected by a rod $g^4$ to a lever $g^5$ which serves as a shifter for two clutches $g^6$ $g^7$ adapted to engage the two bevelled wheels $g^8$ $g^9$ respectively. These bevelled wheels $g^8$ $g^9$ mesh with a bevelled gear $g^{10}$ on a threaded shaft $g^{12}$ (Fig. 3) which when revolved acts to cause one or the other of two pairs of expanding and contracting pulleys $g^{13}$ $g^{14}$ mounted on shafts $g^{11}$ and $g^{22}$ to approach to or recede from each other, according to whether the one or the other clutch $g^6$ $g^7$ is engaged. The movement of the pulleys $g^{13}$ $g^{14}$ is effected by the levers $g^{15}$ $g^{16}$ pivoted at $g^{17}$ $g^{18}$ respectively. The one pair therefore contracts when the other expands. The shaft $g^{22}$ carrying pulleys $g^{14}$ is driven from a pulley $h$ thereon, and its rotation is transmitted to shaft $g^{11}$ by a belt indicated by dotted lines in Fig. 3 and which connects the pairs of pulleys. These pulleys $g^{13}$ $g^{14}$ and the shaft $g^{11}$ are incorporated in the drive to the cutting machine and thence to the sprocket $f^4$ and thus cause an acceleration or retardation as the case may be of shaft $g^{11}$ and, hence, of the feeding devices and of that portion $b^1$ of the conveyor associated therewith. The drive is transmitted to the bevelled wheel $g^8$ or $g^9$ from the shaft $g^{11}$ of the pulleys $g^{13}$ through bevelled gearing $g^{19}$ $g^{20}$ and shaft $g^{21}$ on which the clutch members $g^6$ $g^7$ are keyed to slide. The bevelled wheels $g^8$ $g^9$ revolve loosely on shaft $g^{17}$.

The pulley $h$, mentioned above, is loose on the shaft $g^{22}$ of pulley $g^{14}$ and $h^1$ is a clutch for connecting the pulley $h$ to drive the shaft $g^{22}$. $h^2$ is a hand operatable striking gear for the clutch $h^1$. A rod $h^3$ is mounted to slide in brackets $h^4$ $h^5$ carried by the frame of the machine. At one end this rod abuts against the handle of the shifting lever or gear $h^2$ and at the other end it lies in the path of the carriage $e$ so that when the carriage $e$ reaches one end of its free course it will strike against the end of the rod $h^3$ and operate the shifter $h^2$ to disconnect the drive from pulley $h$ so that the cutting machine and the section $b^1$ of the conveyor are no longer driven positively by their separate drive and the section $b^1$ is only moved by the drive transmitted through the conveyor itself from the gear $f^5$ $f^6$.

At the other end of the free course of the carriage $e$ is arranged the previously-mentioned stop $h^6$. Should the carriage move against this stop and be arrested thereby, as will occur when the drive of section $b^4$ continues to exceed the drive of section $b^1$, the free overrunning clutch $f^{10}$ $f^{11}$ will permit the section $b^1$ to accelerate under the pull exerted on this section $b^1$.

In the modified construction illustrated in Fig. 4, the carriage $e^{10}$ carries fixed to it a casing $e^{11}$ in which is a differential gear of any suitable kind interposed between the shafts $e^{12}$ $e^{13}$ respectively. These shafts are provided with key ways $e^{14}$ $e^{15}$ so that they may slide longitudinally in the hubs of the gear wheels $e^{16}$ $e^{17}$ which are keyed upon them respectively. The gear wheel $e^{16}$ meshes with a skew gear wheel in the drive of section $b^1$ of the conveyor. The gear wheel $e^{17}$ meshes with a gear wheel on the drive of conveyor section $b^4$. So long as both drives synchronize, the cage of the differential in casing $e^{11}$ will remain stationary, but if either drive is accelerated or retarded, the differential action will rotate the cage and also the pinion $e^{18}$ on the shaft thereof. This pinion $e^{18}$ engages the fixed rack $e^{19}$ and will therefore cause the carriage $e^{10}$ to move in one direction or the other whereupon the lever $g^2$ and parts associated therewith (which are as shown in Figs. 2 and 3) will act to apply correction to the drive of conveyor section $b^1$ accordingly.

The differential gear contained in casing $e^{11}$ is illustrated more fully in Figs. 5 and 6, wherein it is shown as comprising a cage $e^{24}$ containing upper and lower bevelled pinions $e^{20}$ and $e^{21}$ meshing with planet gears $e^{22}$ and $e^{23}$ and driven from shaft $e^{12}$ and $e^{13}$, respectively, through suitable gearing. The lower part of the cage has fixed to it an external gear $e^{25}$ which meshes with a gear $e^{26}$ connected to the shaft of the rack wheel $e^{18}$, so that the rotation of the cage about its vertical axis is thus transmitted to the wheel $e^{18}$ through the gears $e^{25}$ and $e^{26}$ and produces the travel of the casing $e^{11}$. When the shafts $e^{12}$ and $e^{13}$ are rotating at the same speed, the pinions $e^{20}$ and $e^{21}$ have no difference of movement; but if either overruns the other, then the cage is revolved, with the result specified.

What I claim as my invention and desire to secure by Letters Patent of the United States is:—

1. The combination of an endless conveyor, means for supporting the same so disposed as to divide the run of the conveyor into two sections, the conveyor where it passes from each section to the other forming a bight of variable length, a floating carriage carrying the said bights, and means for giving independent drive to the two conveyor sections, whereby temporary variation in speed may occur between the two conveyor sections within the capacity of said bights to take up or release the surplus or deficiency respectively of conveyor run between the sections produced by such speed difference.

2. The combination as in claim 1 together with means whereby the movement impressed on the floating carriage causes the speed of the driving means for one section of the conveyor to be varied.

3. The combination as in claim 1 together with means whereby the movement of the floating carriage in either direction from a medial point controls the relative speeds of the driving mechanisms.

4. The combination as in claim 1 in which the driving mechanism of one of the conveyor sections includes gearing for effecting periodical variation in the speed of said section.

5. The combination as in claim 1 in which the driving mechanism of one of the conveyor sections includes gearing for effecting periodical variation in the speed of said section and in which means are provided operated by the movement of the floating carriage for imposing a correction on the average speed of the periodically varied section.

6. The combination as in claim 1 having means for limiting the distance for movement of the carriage and means whereby the carriage at one end of its travel disconnects the drive of one of the sections of the conveyor.

7. The combination as in claim 1 together with a clutch capable of permitting the conveyor speed to overrun the speed of the driving member thereof, the drive of one of the conveyor sections being transmitted through said clutch.

8. The combination as in claim 1 together with a clutch capable of permitting the conveyor speed to overrun the speed of the driving member thereof, the drive of one of the conveyor sections being transmitted through said clutch, and means for resiliently resisting the said overruning while the carriage is free to be moved, said means yielding to permit of the overruning when the carriage reaches one end of a limited travel course.

9. The combination as in claim 1, the carriage carrying a differential mechanism connected with the independent driving mechanisms, means being provided whereby difference between the speeds of the said independent driving mechanisms causes positive movement of said carriage through the action of said differential mechanism.

10. The combination as in claim 1, together with apparatus for feeding spaced objects to the conveyor, and driving mechanism for said feeding apparatus, the said conveyor having one of its sections connected for driving in conformity with the driving mechanism of the feeding apparatus.

In witness whereof I have signed this specification.

GEORGE RALPH BAKER.